(12) United States Patent
Allanic

(10) Patent No.: US 11,667,076 B2
(45) Date of Patent: Jun. 6, 2023

(54) METHOD AND DEVICES FOR RAPID DETECTION AND CALIBRATION OF A 3D PRINTER USING A VISCOUS MATERIAL

(71) Applicant: PRODWAYS, Les Mureaux (FR)

(72) Inventor: André-luc Allanic, Mousseaux-sur-Seine (FR)

(73) Assignee: PRODWAYS

( * ) Notice: Subject to any disclaimer, the term of this patent is extended or adjusted under 35 U.S.C. 154(b) by 442 days.

(21) Appl. No.: 16/674,356

(22) Filed: Nov. 5, 2019

(65) Prior Publication Data

US 2020/0139625 A1   May 7, 2020

(30) Foreign Application Priority Data

Nov. 6, 2018 (FR) .................................... 1860230

(51) Int. Cl.
| | | |
|---|---|---|
| *B29C 64/124* | (2017.01) | |
| *B29C 64/214* | (2017.01) | |
| *B33Y 10/00* | (2015.01) | |
| *B33Y 30/00* | (2015.01) | |

(Continued)

(52) U.S. Cl.
CPC .......... *B29C 64/214* (2017.08); *B29C 64/124* (2017.08); *B33Y 10/00* (2014.12); *B33Y 30/00* (2014.12); *B29C 64/393* (2017.08); *B33Y 50/02* (2014.12)

(58) Field of Classification Search
CPC .... B29C 64/214; B29C 64/124; B29C 64/393
See application file for complete search history.

(56) References Cited

U.S. PATENT DOCUMENTS

| 6,764,636 B1 | 7/2004 | Allanic et al. |
| 2007/0074659 A1* | 4/2007 | Wahlstrom ............ B29C 64/135 |
| | | 118/712 |
| 2017/0057171 A1 | 3/2017 | Chang et al. |

FOREIGN PATENT DOCUMENTS

FR   2790418 A1   9/2000

OTHER PUBLICATIONS

French Search Report for Application No. FR 1860230 dated Sep. 10, 2019, 2 pages.

* cited by examiner

*Primary Examiner* — Monica A Huson
*Assistant Examiner* — Kelsey C Grace
(74) *Attorney, Agent, or Firm* — Lerner David LLP

(57) ABSTRACT

The invention is in particular directed to a method for manufacturing a three-dimensional object by successive deposition of uniform layers of a viscous material, the method comprising a prior calibrating operation comprising the following steps:

positioning at least one calibration stop at a distance comprised between a first distance and a second distance from a working surface, the at least one calibration stop being configured to enable the triggering of a signal in case of contact between the at least one calibration stop and a proximity sensor linked to a recoater blade;

moving the recoater blade (310) linked to the proximity sensor towards one of the at least one calibration stop;

stopping the movement of the recoater blade as soon as a signal indicates a contact between the calibration stop and the proximity sensor; and (Continued)

estimating (320) the distance between the recoater blade and the working surface after stopping the movement, the at least one calibration value comprising the estimated distance.

19 Claims, 3 Drawing Sheets

(51) Int. Cl.
*B33Y 50/02* (2015.01)
*B29C 64/393* (2017.01)

METHOD AND DEVICES FOR RAPID DETECTION AND CALIBRATION OF A 3D PRINTER USING A VISCOUS MATERIAL

CROSS REFERENCE TO RELATED APPLICATIONS

The present application claims priority from French Patent Application No. 1860230, filed on Nov. 6, 2018, the entire content of which is incorporated herein by reference.

TECHNICAL FIELD OF THE INVENTION

The present invention concerns the field of three-dimensional printing, referred to as 3D printing, using a device called a "3D printer". In particular, the invention concerns a method and mechanical systems for detecting and calibrating apparatuses for manufacturing objects, for example ceramic objects, in three dimensions, by stereolithography, in the form of printing by successive layers based on a viscous material.

DESCRIPTION OF THE PRIOR ART

The main techniques for manufacturing ceramic objects, for small series of parts, use pressing, extrusion or injection molding. Moreover, the machining of sintered parts often leads to defects in the material of the finished object. In this context, techniques for fast prototyping offer a very promising alternative for producing complex ceramic parts without using tooling or having recourse to machining.

On latest-generation stereolithography machines, the laser is generally replaced by an ultraviolet (UV) light emitting diode and an optical system comprising a DLP projector (DLP standing for Digital Light Processing), in which is integrated a high resolution dynamic mask—DMD (standing for Digital Micro-mirror Device). This high spatial resolution device (e.g. with a spatial resolution of 32 µm) enables parts to be manufactured with very fine detail combined with a high productivity increase relative to existing machines on the 3D printing market.

In known manner, the manufacture of three-dimensional metal or ceramic objects by 3D printing may be carried out on a bed of powder, by agglomeration of material using, for example, infra-red scanning, or using a liquid or pasty composition which is employed to create a three-dimensional object referred to as raw, the latter next being debinded then sintered.

A pasty composition is typically composed of a powder and a polymer of photo-polymerizable type enabling the hardening of the material. In this type of process, the pasty composition used typically has a dynamic viscosity comprised between 5 and 20 Pascal second (Pa·s), giving optimum conditions of adaptation of the speed of flow in the printing machine used.

Putting these viscous materials in layers requires particular recoaters using blades, which define the height of the layer deposited above a build platform.

U.S. Pat. No. 6,764,636 describes an example of recoater blades, in particular with reference to FIGS. 3a to 3c, which can be used for such purposes. According to this example, the recoater blades (assemblies 40 and 41 each comprising a pusher and two rollers) alternately deposit layers of material from left to right and from right to left on the working field 45 located on a print bed (as the case may be on a layer already deposited). The thickness of the layer deposited by the recoater blade 40, that is to say the distance between the bottom of the recoater blade 40 and the working field 45, is defined by adjustment of a stop 47. Similarly, the thickness of the layer deposited by the recoater blade 41 is defined by a stop 48.

It is important for this thickness to be controlled. If the thickness is too slight, the manufactured part will be difficult to detach from the working field 45. This is because the solidification of the material in a 3D printer is typically performed to a depth slightly greater than the desired thickness of the layer, so as to enable the adhesion of the current layer to the preceding layer. If the thickness of the layer is too slight, the depth of solidification greatly exceeds the thickness of the layer and the adhesion is thus too strong, which can make the part difficult to detach from its bed. Conversely, if the thickness of the layer is too great, the depth of solidification is not sufficiently great to ensure proper adhesion with the working field 45. The part thus has the risk of detaching during the movement of the recoater blade. Furthermore, it is important for the thickness of the layer deposited by the recoater blade 40 to be as close as possible to the thickness of the layer deposited by the blade 41 to avoid the final part being composed of layers of heterogeneous thickness, some being thicker than others.

The stops 47 and 48 must be adjusted to meet all these objectives. This adjusting procedure is known but is complex and the quality of the adjustment depends on the competence of the operator. This complex adjusting must, preferably, be redone each time a critical component is modified, for example when the recoater blades 40 and 41 are replaced or when the print bed is modified. In industrial use, these events are common: the recoater blades wear and the print bed is typically replaced between two productions.

The complexity of the adjustment is thus a drawback for industrial applications. It leads to an increase in the final production cost of the parts manufactured.

To mitigate this drawback, the solutions of the prior art generally consist in improving the ergonomics of the adjustment. For example, in the 3D printer known under the name ProMaker V6000 (ProMaker V6000 is a trademark), commercialized as of 2014 by the company Prodways, the equivalent of stops 47 and 48 is a motorized shaft with an accurate measurement of the positions which make it possible to return to the pre-existing adjustments rapidly and reliably. The user may more particularly accurately adjust the position of each motor actuating the two recoater blades.

On the other hand, determining the adjustments still relies on the competence of an operator who predetermines the adjustments. Furthermore, the predetermined adjustments do not allow the use of print beds that are interchangeable and slightly different from each other as commonly occurs in an industrial setting.

There is thus a need to make the adjustment independent of the operator and robust in relation to changes of the relevant mechanical parts.

SUMMARY OF THE INVENTION

The invention enables at least one of the problems set forth above to be solved.

The invention is thus directed to a method for manufacturing a three-dimensional object by successive depositions of layers of a viscous material comprising the following steps:
provide a working surface on which layers are deposited;
providing a volume of viscous material in proximity to the working surface;

applying at least one portion of the volume of viscous material onto the working surface by moving, substantially parallel to the working surface, at least one recoater blade linked to a proximity sensor, said recoater blade being held, during its movement, at a predetermined distance from said working surface, characterized in that the predetermined distance is calculated according to at least one calibration value defined in a prior calibrating operation comprising the following steps:

positioning at least one calibration stop at a distance comprised between a first distance and a second distance from the working surface, the at least one calibration stop being configured to enable the triggering of a signal in case of contact between the at least one calibration stop and the proximity sensor;

moving the recoater blade linked to the proximity sensor towards one of the at least one calibration stop;

stopping the movement of the recoater blade as soon as a signal indicates a contact between the calibration stop and the proximity sensor; and estimating the distance between the recoater blade and the working surface after stopping the movement, the at least one calibration value comprising the estimated distance.

The method according to the invention thus enables an adjustment of the height of the recoater blades which is independent of an operator and which is robust in relation to changes in the relevant mechanical parts. It also enables the manufacturing costs of an object to be reduced.

According to one embodiment, the method further comprises, during the prior calibrating step, a step of estimating an initial position corresponding to the position of the recoater blade, after stopping the movement, in relation to an axis and a reference point linked to a motor used to modify the height of the recoater blade, the at least one calibration value comprising the initial position.

According to one embodiment, the axis and the reference point are linked to a motor used to modify the height of the recoater blade.

According to one embodiment, the movement is a vertical movement towards a top calibration stop or towards a bottom calibration stop.

According to one embodiment, the first distance is equal to −100 mm.

According to one embodiment, the second distance is equal to +100 mm.

According to one embodiment, the prior calibrating operation comprises an initial step of positioning the recoater blade linked to the proximity sensor at a predetermined distance from the calibration stop.

The invention is also directed to a device for manufacturing a three-dimensional object by successive depositions of layers of a viscous material, the device comprising a microprocessor configured to implement each of the steps of the prior calibrating operation of the method described above as well as to a computer program for manufacturing a three-dimensional object by successive depositions of layers of a viscous material, the computer program comprising instructions to implement each of the steps of the prior calibrating operation of the method described above when the computer program is run by a computer.

The advantages procured by this device and this computer program and that device are similar to those described above.

BRIEF DESCRIPTION OF THE DRAWINGS

Other advantages, objects and features of the present invention will emerge from the following detailed description, given by way of non-limiting example, relative to the accompanying drawings in which.

DETAILED DESCRIPTION OF THE INVENTION

Figure 1A:
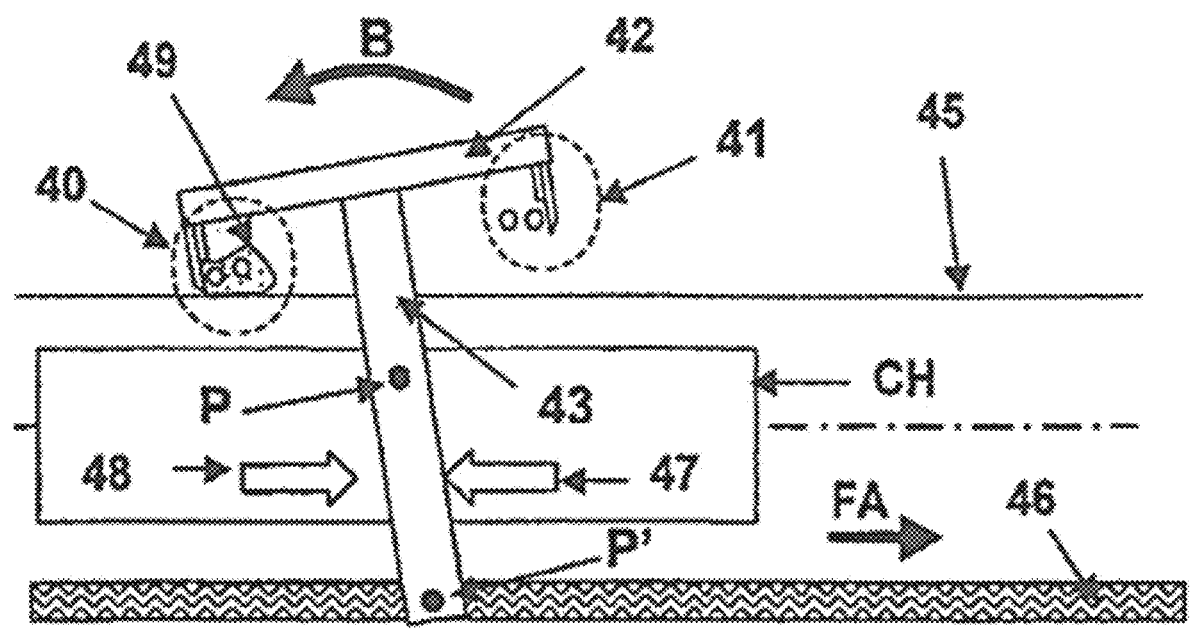
FIG. 1, comprising FIGS. 1A and 1B, diagrammatically illustrates an example of recoater blades according to the prior art, according to which the adjustment of the recoater blades is carried out by adjustment of stops.

As illustrated in FIG. 1A, the recoater blade 40 is flush with the working surface 45 located on the surface of the last layer of material deposited for the purpose of manufacturing an object on the print bed on which is manufactured the object when no layer has yet been deposited. The recoater blade is attached here to the part comprising the members 42 and 43 which are able to pivot to reach two positions, by rotation around a first pivot P, under the action of a traction force applied, for example, by a belt 46 linked to the member 42 via a second pivot P'. As illustrated, the movement of the belt 46 in the direction FA gives rise to the rocking of the part comprising the members 42 and 43 until entry into contact with the stop 47. This stop may be adjusted to adjust the distance between the bottom of the recoater blade 40 and the working surface 45. For example, a small adjustment of the stop 47 in the direction FA enables the part comprising the members 42 and 43 to increase the amplitude of the movement in the direction of rotation B, which results in reducing the distance between the bottom of the recoater blade 40 and the working surface 45. Conversely, an adjustment of the stop 47 in the opposite direction to the direction FA results in increasing the distance between the bottom of the recoater blade 40 and the working surface 45.

Figure 1B:
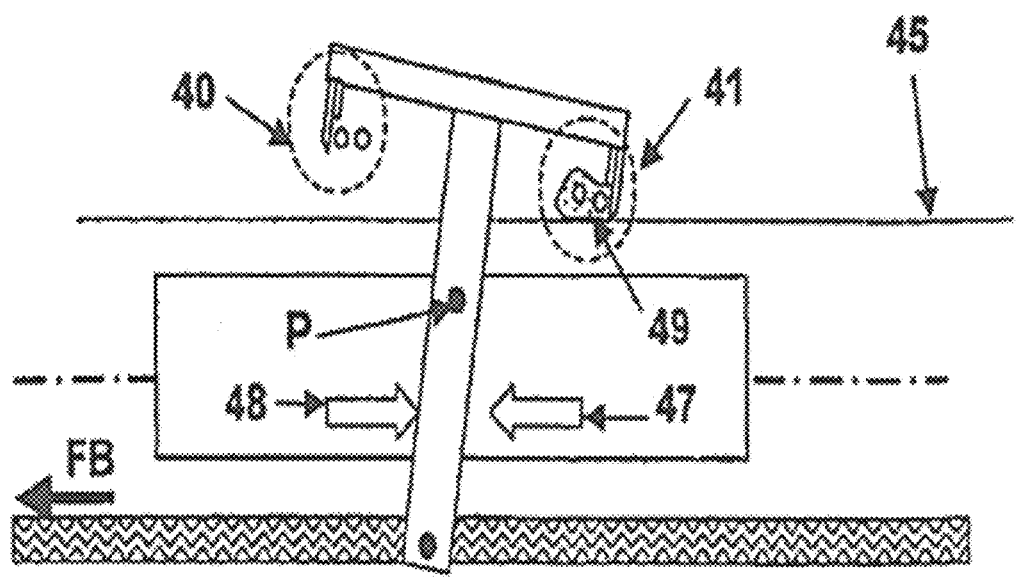

In similar manner, when the part comprising the members 42 and 43 is pivoted so as to bring the bottom of the recoater blade 41 closer to the working surface 45, as illustrated in FIG. 1B (when the movement of the belt 46 corresponds to the direction FB), the adjustment of the stop 48 enables the adjustment of the distance between the bottom of the recoater blade 41 and the working surface 45. For example, to adjust the stop 48 in the direction FB results in reducing the distance between the bottom of the recoater blade 41 and the working surface 45.

As described above, the adjustment of the stops 47 and 48 is fastidious and requires special competence from the operators. To be precise, the distances between the bottom of the recoater blades 40 and 41 and the working surface 45 are assessed and measured by means that vary according to the operators.

The invention is in particular directed to making it possible to automate and increase the reliability of the measurements required for adjusting the recoater blades 40 and 41 using a method concerning the adjustments applied to the stops 47 and 48.

Figure 2:
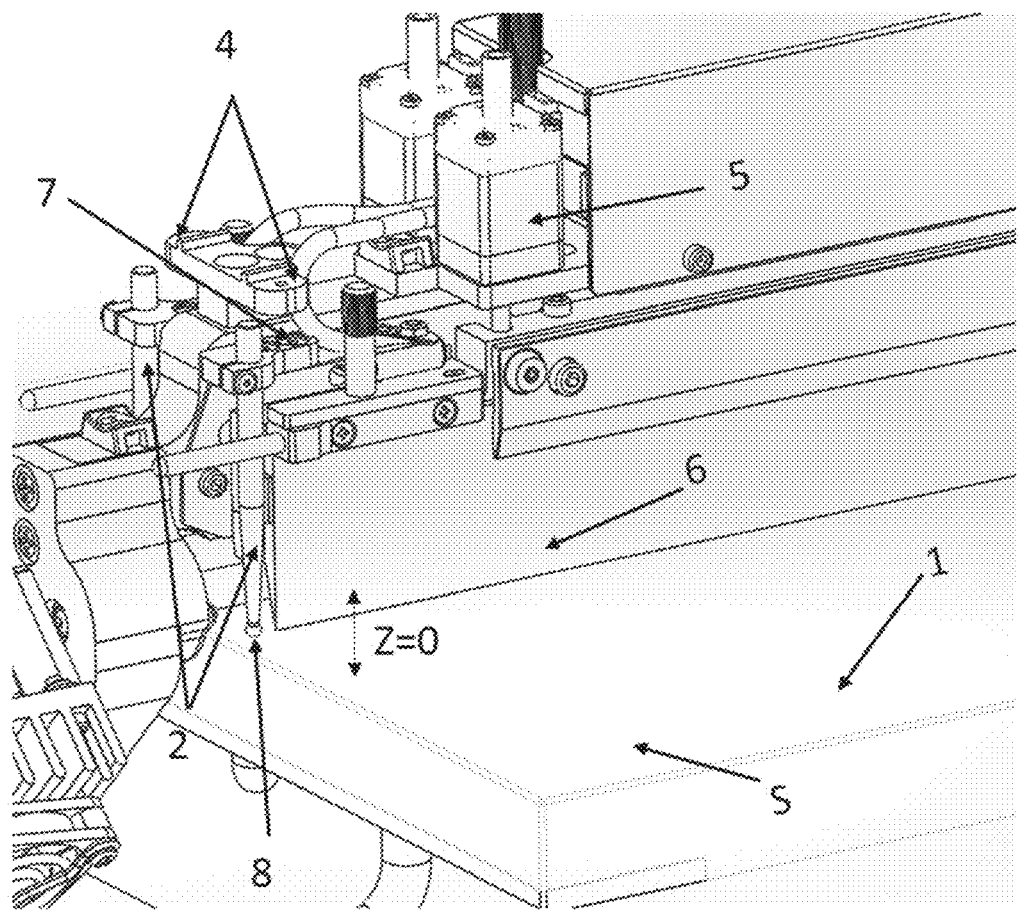
FIG. 2 diagrammatically illustrates part of a 3D printer comprising a recoater blade according to one embodiment of the invention with proximity sensors which detect, using pressing force, the level to which the recoater blade can descend towards the working surface.

FIG. 2 diagrammatically illustrates part of a 3D printer comprising a recoater blade according to one embodiment of the invention with proximity sensors which detect, using pressing force, the level to which the recoater blade can descend towards the working surface;

More particularly, FIG. 2 illustrates an assembly comprising two recoater blades (only one of which is visible) as well as a mechanism for calibrating the height of the recoater blades, enabling precise adjustment of the height of the recoater blades.

As illustrated, the system comprises two calibration stops: a lower calibration stop corresponding to a reference member 1 (typically the print bed, also called table) of which the upper plane coincides with the working surface (before the first layer is deposited) and upper calibration stops 4. These calibration stops are preferably rigidly fastened to a 3D printer bed. The system also comprises two recoater blades, including the recoater blade 6, which are movable relative to the calibration stops, capable of adjustment in height and of moving along an axis parallel to the working surface as well as proximity sensors, comprising the proximity sensor 2 associated with the recoater blade 6.

The system further comprises reliable and accurate motors to modify the height of the recoater blades, in particular for the purpose of the successive deposits of viscous material used to manufacture an object (it being observed that after an initial adjustment of the height of the recoater blades, a deposit of viscous material is typically carried out after a movement of the fastening bed downwardly, without vertical movement of the recoater blades).

Thus, for example, the motor 5 enables the height of the recoater blade 6 to be modified. The motor 5 makes it possible to move the recoater blade 6 and the proximity sensor 2 relative to the working surface S, and thus relative to the calibration stops 1 and 4. The same applies for the recoater blades, proximity sensors and motors which are not shown.

As described above, the upper plane of the reference member 1 (print bed or marble) here coincides with the working surface (before deposit of the first layer), forming a calibration stop located at zero distance from the working surface S. According to a particular embodiment, the calibration stops 4 are located at a predetermined distance, for example a distance comprised between +50 millimeters and +150 millimeters, preferably a distance of +100 millimeters, from the working surface S.

It should be noted that this distance is only given by way of illustration. According to other embodiments, the calibration stops 4 are located at a distance less than 50 millimeters or even negative for example −100 millimeters thus below the working surface.

As illustrated in FIG. 2, the proximity sensor 2 makes it possible, when the recoater blade moves downwards or upwards, to detect a contact downwards with the reference member 1 (print bed or marble), contact point referenced 8, or a contact upwards with the calibration stop 4, contact point referenced 7. The detection of a downward and/or upward contact enables calibration of the mechanism for the purpose of adjusting the height of the recoater blade 6.

According to one embodiment, determining the position of the recoater blade 6 along a vertical axis, corresponding to the movement controlled by the motor 5, is carried out using an initial distance and an initial position that are determined during a calibration phase. This calibration phase may comprise the following steps:

checking that the recoater blade 6 is not in contact with the lower calibration stop 1, for example by placing it a few millimeters above that calibration stop;

next lowering the recoater blade 6 and the proximity sensor 2 by increments of small value, for example by increments of a value less than one millimeter, for example by increments of ten micrometers. It is noted here that these increments may be dynamically adjusted on lowering the recoater blade 6 and the proximity sensor 2, to obtain faster movements when they are far from the calibration stop and more accurate when they are close to the calibration stop;

after each movement by one increment, performing a test to determine whether the proximity sensor 2 has detected the contact with the calibration stop 1;

if the contact is not detected, repeating the step of lowering the recoater blade 6 and the proximity sensor 2 and the test step until the detection of contact between the proximity sensor 2 and the calibration stop 1;

when the contact has been detected, define the distance measured between the bottom part of the recoater blade 6 and the working surface S as the initial distance Di and defining the position of the bottom part of the recoater blade 6 along the axis of the motor 5 and a reference point as the initial position Pi.

The initial distance and the initial position then make it possible to accurately control the position of the recoater blade 6.

Thus, for example, when the first layer of material is to be deposited on the print bed, for example a layer having a controlled thickness E, the recoater blade 6 is moved, along an axis substantially perpendicular to the working surface S, using the motor 5, while positioning the recoater blade at a position P calculated as follows:

$$P=Pi+(E-Di)$$

Similarly, the calibration may be carried out using a top calibration stop.

The following layers of viscous material are typically deposited by lowering the print bed, without modifying the height of the recoater blades.

Thus, the adjustment of the stops for controlling the height of the recoater blades becomes possible to automate and reliable, not therefore dependent upon the competence of an operator. Furthermore, any change of stop is automatically taken into account by the procedure. By way of illustration, in an industrial use, the print beds (marbles) on which are manufactured the objects are typically changed between two productions. With this procedure, the adjustment of the recoated blades adapts to all variations between the different print beds.

Figure 3:
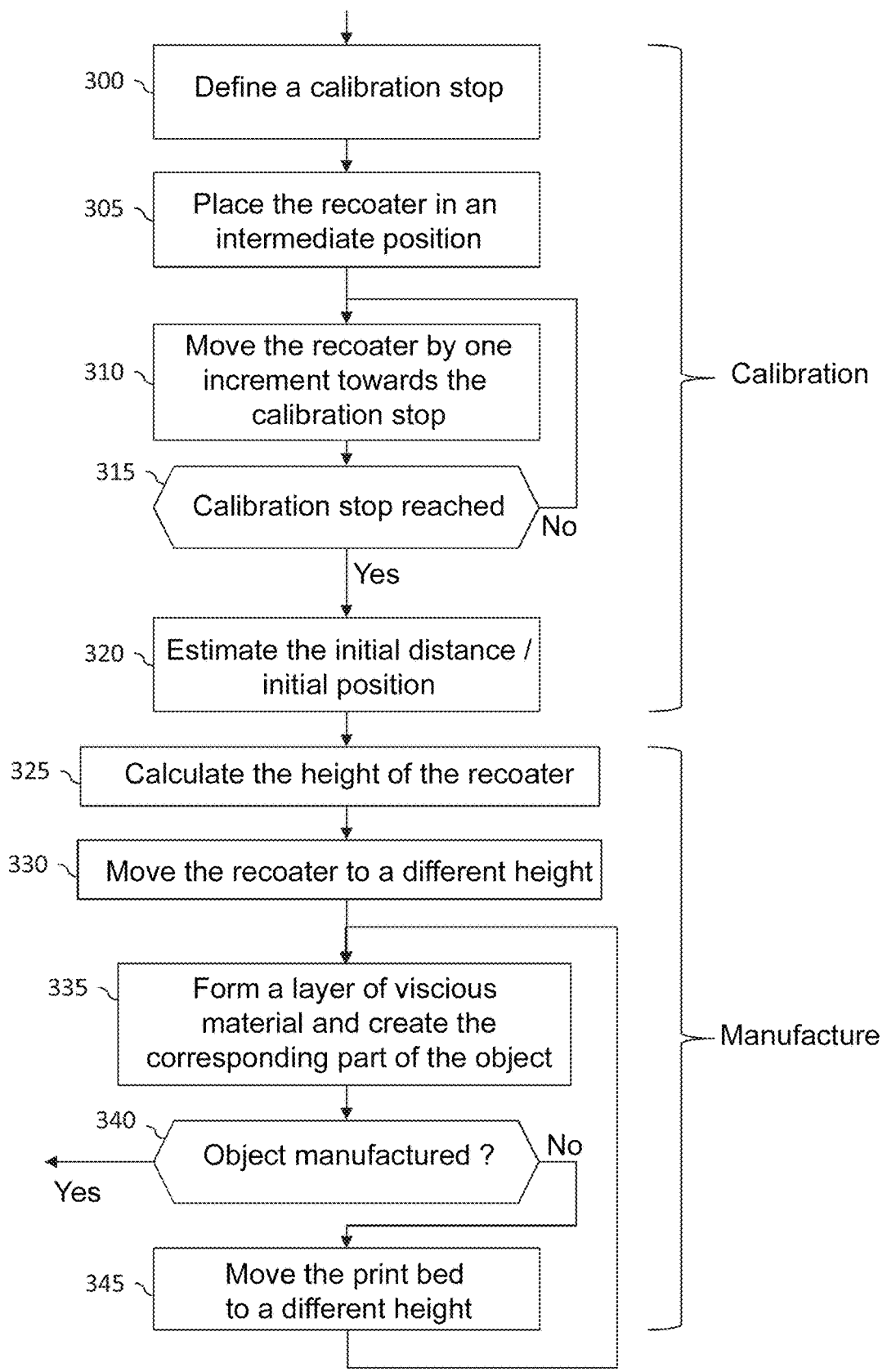
FIG. 3 illustrates steps of a method according to embodiments to control the height of recoater blades during the manufacture of an object.

FIG. 3 illustrates steps of a method according to embodiments to control the height of recoater blades during the manufacture of an object. As illustrated, these steps comprise calibrating steps and manufacturing steps.

A first calibrating step is directed to defining at least one calibration stop (step 300), for example a bottom stop (for example the calibration stop 1 in FIG. 2) or a top stop (for example the calibration stop 4 in FIG. 2).

In a following step (step 305), the recoater blade is positioned in an intermediate position such that the proximity sensor associated with the recoater blade concerned is not in contact with the calibration stop defined in earlier.

The recoater blade is then moved by one increment, for example ten micrometers, towards the calibration stop defined previously (step 310) and a test is carried out to determine whether the proximity sensor associated with the recoater blade concerned is in contact with the calibration stop defined previously (step 315).

If the proximity sensor associated with the recoater blade concerned is not in contact with the calibration stop defined previously, the steps of moving the recoater blade and of testing (steps 310 and 315) are repeated.

On the contrary, if the proximity sensor associated with the recoater blade concerned is in contact with the calibration stop defined earlier, an initial distance and, preferably, an initial position, are estimated (step 320). As described above, the initial distance may correspond to the distance between the calibration stop and the bottom part of the recoater blade when the proximity sensor associated with the recoater blade concerned enters into contact with the calibration stop defined previously. The initial position may be the position of the low part of the recoater blade on a vertical axis of movement of the recoater blade (typically the axis of the motor controlling the height of the recoater blade) relative to a reference point which may correspond, for example, to the calibration stop.

The initial distance and, preferably the initial position that are estimated may then be used in a manufacturing phase to control the height of the recoater blade.

In some embodiments, the initial position may be set at zero.

For these purposes, a first step is directed to calculating the height of the bottom part of the recoater blade based on the thickness of the layer of viscous material to deposit, on the initial distance and, as the case may be, on the initial position (step 325). The recoater blade is then positioned, with regard to height, at the calculated height (step 330).

In a following step (step 335), a layer of viscous material is deposited and the corresponding part of the object in course of manufacture is produced.

A test is then carried out to determine whether all the layers of the object have been treated (step 340).

If not all the layers of the object have been treated, the print bed is moved along a vertical axis (step 345), typically downwardly, and the steps of depositing a layer of viscous material and of producing the corresponding part of the object in course of manufacture are repeated until all the layers have been treated.

Figure 4:
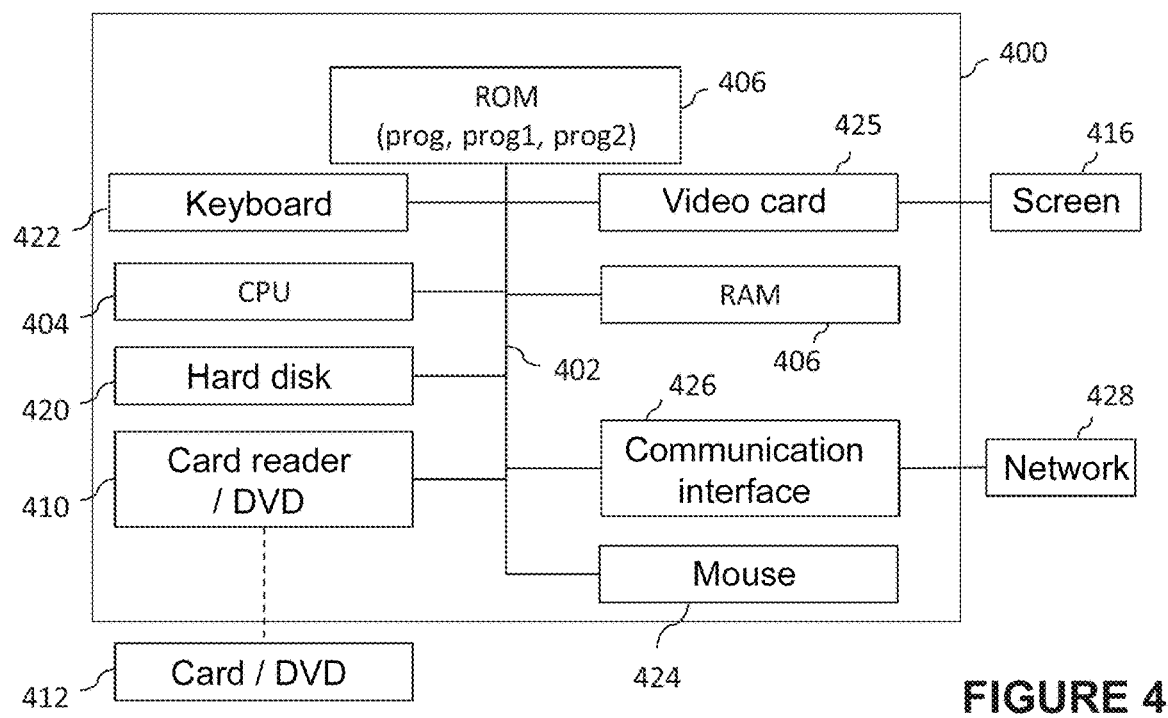
FIG. 4 illustrates an example of an information processing device adapted to implement, at least partially, an embodiment of the invention.

FIG. 4 illustrates an example of a device able to be used to at least partially implement an embodiment, in particular of the steps described above to control the height of the recoater blades.

The device 400 is for example a computer.

The device 400 preferably comprises a communication bus 402 to which are connected:
  a central processing unit (CPU) or microprocessor 404;
  A read only memory 406 (ROM) able to include the operating system and programs such as "Prog"; and
  a random access memory (RAM) or cache memory 408, comprising registers adapted to record variables and parameters created and modified during the execution of the aforementioned programs.

Optionally, the device 400 may also have the following elements:
  a hard disk 420 able to contain the aforesaid programs "Prog" and data processed or to be processed according to the invention;
  a reader 410 of a removable storage medium 412 such as a memory card or a disc, for example a DVD disc;
  a graphics card 414 linked to a screen 416;
  a keyboard 422 and a mouse 424 and any other pointing device such as an optical stylus, a touch screen or a remote control enabling the user to interact with the programs according to the invention; and
  a communication interface 426 connected to a distributed communication network 428, for example a wireless communication network and/or a local communication network, the interface being configured to send and receive data.

The communication bus allows communication and interoperability between the different elements included in the device 400 or connected to it. The representation of the bus is non-limiting and, in particular, the central processing unit may communicate instructions to any element of the device 400 directly or by means of another element of the device 400.

The executable code of each program enabling the programmable apparatus to implement the processes according to the invention, in particular to control the height of the recoater blades, may be stored, for example, on the hard disk 420 or in read only memory 406.

According to a variant, the executable code of the programs can be received by the intermediary of the communication network 428, via the interface 426, in order to be stored in an identical fashion to that described previously.

More generally, the program or programs may be loaded into one of the storage means of the device 400 before being executed.

The central processing unit 404 will control and direct the execution of the instructions or portions of software code of the program or programs according to the invention, these instructions being stored on the hard disk 420 or in the read-only memory 406 or in the other aforementioned storage elements. On powering up, the program or programs which are stored in a non-volatile memory, for example the hard disk 420 or the read only memory 406, are transferred into the random-access memory 408, which then contains the executable code of the program or programs according to the invention, as well as registers for storing the variables and parameters necessary for implementation of the invention.

The present invention has been described and illustrated in the present detailed description with reference to the appended Figures. However, the present invention is not limited to the embodiments presented. Other variants and embodiments may be deduced and implemented by the person competent in the field of the invention on reading the present description and appended Figures. By way of illustration, the proximity sensors implemented may be contactless proximity sensors, making it possible to accurately determine a contact relative to a part without touching the latter.

In the claims, the term "comprise" does not exclude other elements or other steps. The indefinite article "a" does not exclude the plural. A single processor or several other units may be used to implement the invention. The different features presented and/or claimed may advantageously be combined. Their presence in the description or in different dependent claims, does not indeed exclude the possibility of combining them. The reference signs are not to be understood as limiting the scope of the invention.

The invention claimed is:

1. A method for manufacturing a three-dimensional object by successive depositions of layers of a viscous material comprising the following steps:
  providing a working surface on which layers are deposited;
  providing a volume of viscous material in proximity to the working surface;
  applying at least one portion of the volume of viscous material onto the working surface by moving, substantially parallel to the working surface, at least one recoater blade linked to a proximity sensor, said recoater blade being held, during its movement, at a predetermined distance from said working surface, characterized in that the predetermined distance is calculated according to at least one calibration value defined in a prior calibrating operation comprising the following steps:

positioning at least one calibration stop at a distance comprised between a first distance and a second distance from the working surface, the at least one calibration stop being configured to enable the triggering of a signal in case of contact between the at least one calibration stop and the proximity sensor, wherein the first distance is equal to −100 mm;

moving the recoater blade linked to the proximity sensor towards one of the at least one calibration stop;

stopping the movement of the recoater blade as soon as a signal indicates a contact between the calibration stop and the proximity sensor; and estimating the distance between the recoater blade and the working surface after stopping the movement, the at least one calibration value comprising the estimated distance.

2. The method according to claim 1, further comprising, during the prior calibrating step, a step of estimating an initial position corresponding to the position of the recoater blade, after stopping the movement, in relation to an axis and a reference point linked to a motor used to modify the height of the recoater blade, the at least one calibration value comprising the initial position.

3. The method according to claim 2, wherein the axis and the reference point are linked to a motor used to modify the height of the recoater blade.

4. The method according to claim 1 wherein the movement is a vertical movement towards a top calibration stop or towards a bottom calibration stop.

5. A method for manufacturing a three-dimensional object by successive depositions of layers of a viscous material comprising the following steps:

providing a working surface on which layers are deposited;

providing a volume of viscous material in proximity to the working surface;

applying at least one portion of the volume of viscous material onto the working surface by moving, substantially parallel to the working surface, at least one recoater blade linked to a proximity sensor, said recoater blade being held, during its movement, at a predetermined distance from said working surface, characterized in that the predetermined distance is calculated according to at least one calibration value defined in a prior calibrating operation comprising the following steps:

positioning at least one calibration stop at a distance comprised between a first distance and a second distance from the working surface, the at least one calibration stop being configured to enable the triggering of a signal in case of contact between the at least one calibration stop and the proximity sensor, wherein the second distance is equal to +100 mm;

moving the recoater blade linked to the proximity sensor towards one of the at least one calibration stop;

stopping the movement of the recoater blade as soon as a signal indicates a contact between the calibration stop and the proximity sensor; and estimating the distance between the recoater blade and the working surface after stopping the movement, the at least one calibration value comprising the estimated distance.

6. The method according to claim 1 wherein the prior calibrating operation comprises an initial step of positioning the recoater blade linked to the proximity sensor at a predetermined distance from the calibration stop.

7. The method according to claim 2, wherein the movement is a vertical movement towards a top calibration stop or towards a bottom calibration stop.

8. The method according to claim 2, wherein the prior calibrating operation comprises an initial step of positioning the recoater blade linked to the proximity sensor at a predetermined distance from the calibration stop.

9. The method according to claim 3, wherein the movement is a vertical movement towards a top calibration stop or towards a bottom calibration stop.

10. The method according to claim 3, wherein the prior calibrating operation comprises an initial step of positioning the recoater blade linked to the proximity sensor at a predetermined distance from the calibration stop.

11. The method according to claim 4, wherein the prior calibrating operation comprises an initial step of positioning the recoater blade linked to the proximity sensor at a predetermined distance from the calibration stop.

12. The method according to claim 5, further comprising, during the prior calibrating step, a step of estimating an initial position corresponding to the position of the recoater blade, after stopping the movement, in relation to an axis and a reference point linked to a motor used to modify the height of the recoater blade, the at least one calibration value comprising the initial position.

13. The method according to claim 12, wherein the axis and the reference point are linked to a motor used to modify the height of the recoater blade.

14. The method according to claim 5 wherein the movement is a vertical movement towards a top calibration stop or towards a bottom calibration stop.

15. The method according to claim 5 wherein the prior calibrating operation comprises an initial step of positioning the recoater blade linked to the proximity sensor at a predetermined distance from the calibration stop.

16. The method according to claim 12, wherein the movement is a vertical movement towards a top calibration stop or towards a bottom calibration stop.

17. The method according to claim 12, wherein the prior calibrating operation comprises an initial step of positioning the recoater blade linked to the proximity sensor at a predetermined distance from the calibration stop.

18. The method according to claim 13, wherein the movement is a vertical movement towards a top calibration stop or towards a bottom calibration stop.

19. The method according to claim 13, wherein the prior calibrating operation comprises an initial step of positioning the recoater blade linked to the proximity sensor at a predetermined distance from the calibration stop.

* * * * *